United States Patent

Taylor

[15] 3,683,681

[45] Aug. 15, 1972

[54] METHOD AND APPARATUS FOR SOFTNESS TESTING

[72] Inventor: Ruel E. Taylor, Gorham, Maine

[73] Assignee: Ruel E. Taylor, Inc., Gorham, Maine

[22] Filed: March 19, 1971

[21] Appl. No.: 126,204

[52] U.S. Cl. ............................................73/78, 73/159
[51] Int. Cl. ..................................................G01n 19/00
[58] Field of Search....73/78, 100, 67, 67.2, 70, 71.4, 73/159; 181/.5 NP

[56] References Cited

UNITED STATES PATENTS

| | | | |
|---|---|---|---|
| 2,752,781 | 7/1956 | Thorsen | 73/159 |
| 2,922,303 | 1/1960 | Veneklasen et al. | 73/159 |

*Primary Examiner*—James J. Gill
*Attorney*—Chittick, Rfund, Birch, Samuels & Gauthier

[57] ABSTRACT

A paper fabric softness tester provides for a standard flexing of a sample of the fabric with a sound sensor and detector which detects and indicates sound level frequencies which are related to the softness of the fiber

15 Claims, 5 Drawing Figures

INVENTOR
RUEL E. TAYLOR

ATTORNEYS

METHOD AND APPARATUS FOR SOFTNESS TESTING

BACKGROUND OF THE INVENTION

Softness of fabrics is an important feature which is related to the quality of the fibers and the manner in which the fabrics are formed. It is often necessary to have a knowledge of softness of certain fabrics, especially of those which are designated for manufacture of disposable cloth substitutes. Those cloth substitutes are frequently used for various hygienic and medical purposes in hospitals and in other applications for disposable fabric items.

The softness of disposable fabrics is affected by a number of physical, chemical and mechanical properties, such as the kind of fiber, fiber size, bonding, number of plys and thread of the scrim, if used, weight by volume of the material, moisture content, water-holding properties, chemical additives, Ph, etc.

DESCRIPTION OF THE PRIOR ART

In the past there has been no objective method of testing the softness properties of fabrics. Generally the method for determining softness of a sample of paper or similar material has been a test carried out by a person of long experience who sensed the sample by handling it and so recognized the relative stiffness or the compliance of the fabric in an entirely subjective way.

Another method of partial evaluation of softness is by examining the surface texture of the material by a microscope which shows the size and roughness of a material having a more or less smooth macroscopic surface.

Another quality related to softness is the weight of a certain volume of the fabric, that is the density, which is preferred to be relatively low. This property of softness is also related to its heat insulating property since low density materials tend to have low thermal conductivity caused by the relatively high number of internal air spaces within the material.

The water-holding properties or porosity of the material can be determined by Mullen Burst Test, Transverse Tear Test and Shoppe Shear Test. This is the actual ability of the material to permit flow of air or water through it. The porosity of the material is partly related to its softness.

Other tests consist of a stiffness test which is not directly correlated with softness as is often assumed.

The foregoing methods of measuring and determining properties of fabrics related to their softness are either inaccurate or inconvenient and do not provide an objective test of fabric softness.

SUMMARY OF THE INVENTION

In accordance with the present invention in its broad aspects it has been found that by flexing a paper fabric or other material to be tested for softness a sound energy spectrum is generated which extends from audio frequency into the ultrasonic range. If the flexing motion is relatively standardized, the sound energy level will be closely related to the aforementioned properties which determine softness and the amplitude function of the spectrum or a selected frequency band therefore can be taken as an objective measure of softness. By selecting an ultrasonic band of frequencies to produce the measurement, the indication can be obtained relatively immune to ambient background noise as these masking noises generally occur in the audio frequency range and are relatively easy to isolate from influencing the measurement. By translating the ultrasonic sound signal to the audio frequency range, an audible reproduction of the signal permits aural evaluation of the type and character of the ultrasonic sound generated by the sample in addition to the amplitude or energy level indicated by a signal level meter. Accordingly, it is a general object of the invention to provide a method of composite softness testing of fabrics yielding objective results.

It is another principal object of the invention to provide a self-contained apparatus for testing softness of fabrics giving objective results.

It is another object of the invention to provide an apparatus for softness testing to be used with a continuously advanced sample of fabric and evaluating the softness by means of a measuring instrument and audio loudspeaker or either indication used alone.

It is another object of the invention to provide an apparatus for testing softness utilizing means for alternate reverse bending of a strip of the fabric thus producing a repeated number of small radius bendings as the strip is advanced to cause the internal fibers of the fabric to rub against each other.

It is another object of the invention to provide an apparatus for testing softness utilizing means for detecting a sound signal which is produced by the fibers of the fabric being rubbed toether and which is representative of the softness of the material being tested, further utilizing means for generating an electrical signal responsive to the sound signal and means for indicating the electrical signal either as an audible range signal to be evaluated by a loudspeaker or by a signal level measuring instrument or both.

It is still another object of the invention to provide an apparatus for testing softness of fabrics inserted in a soundproof box to protect the measured sound signal against external noise.

These and other objects and features of the invention will become more apparent from the following description of a preferred embodiment and accompanying drawings in which.

PREFERRED EMBODIMENT

Figure 2:
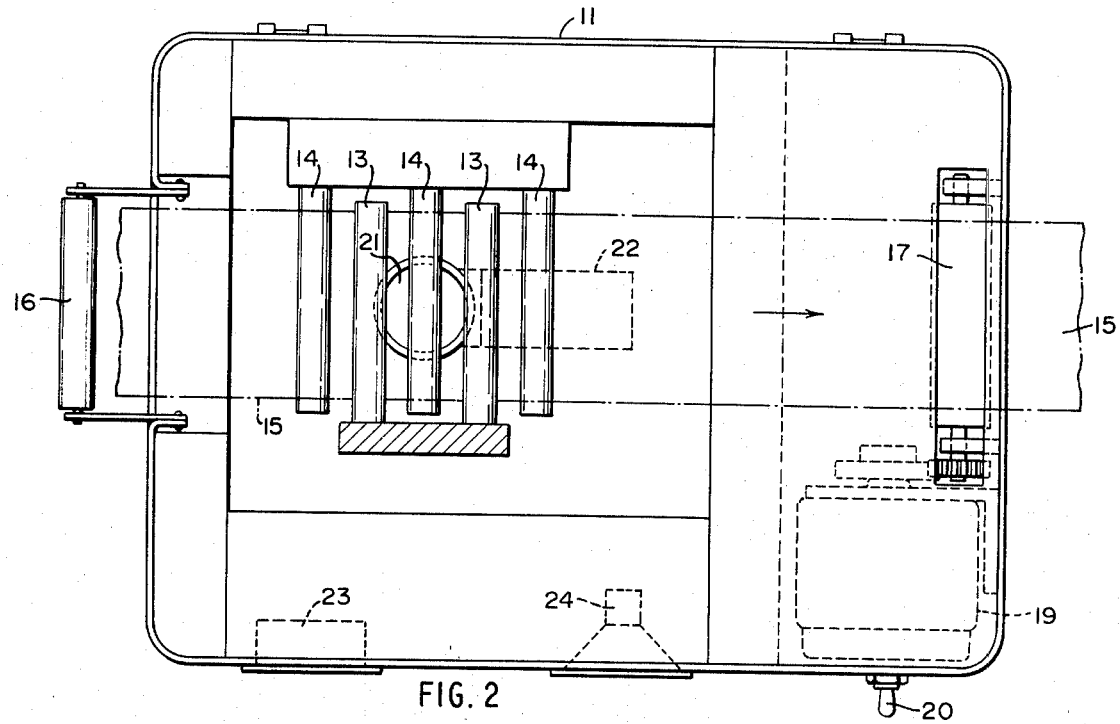
FIG. 2 is a sectional view of the apparatus shown in FIG. 1 taken on line 2-2 of FIG. 1.
Figure 1:
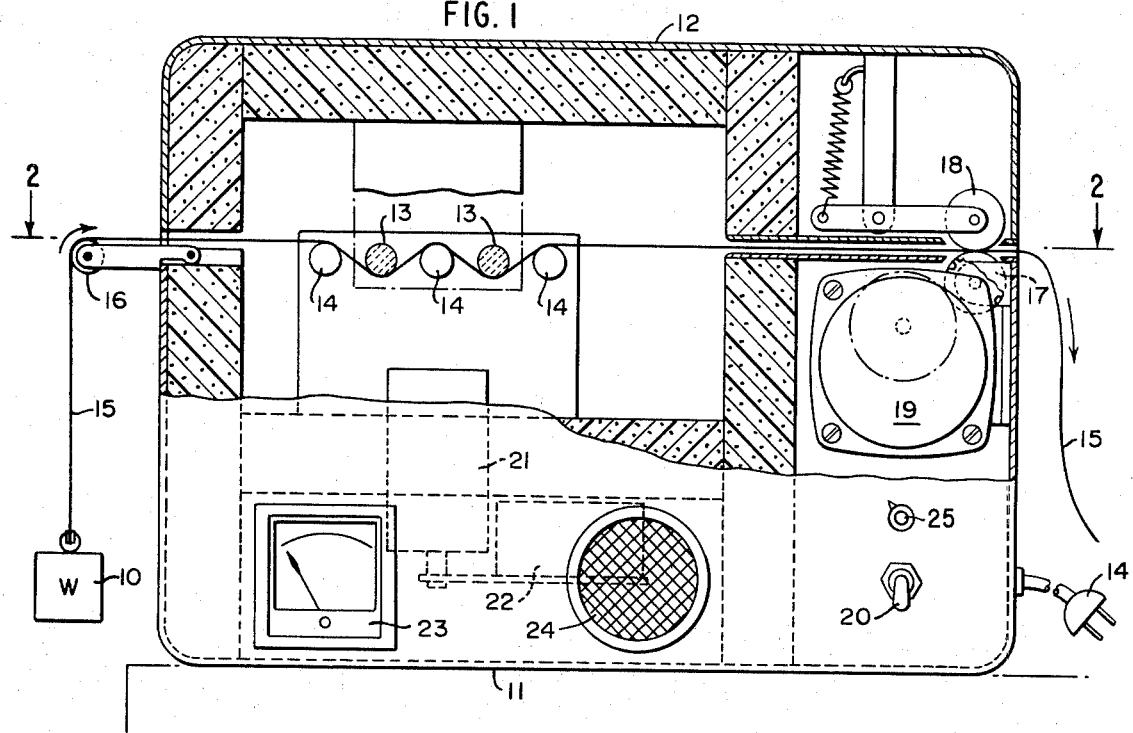
FIG. 1 is an elevational view partly in section, of the apparatus for measuring softness according to the preferred embodiment of the present invention.

A preferred embodiment of the invention is shown in FIGS. 1 and 2. The softness measuring instrument is built in a soundproof box 11 having a hinged-type cover 12. In the upper part of box 11, a first set of parallel rigidly mounted glass rods 14 is arranged in a row. A second set of rods 13 is mounted in the same manner to the hinged cover 12 in such a way that if the cover of the box is closed each rod of the second set is placed in a space between two adjacent rods of the first set so that both sets of glass rods form a single row of parallel coplanar rods. A sample of the fabric to be tested, e.g., a paper strip 15 is fed over an entry roller 16 mounted at the input end of the box and in alignment with the first set of rods 14. The entry roller 16 is hinged and adapted to be folded into the box when not in use. At the output end of the box 11, the paper strip 15 is drawn out from the instrument by two engaging output rollers 17, 18, forming a nip having a high friction surface to ensure driving contact with the surface of paper strip 15. Roller 17 is driven by a constant speed drive motor 19 actuated by switch 20. Power is also supplied to the electronic detector unit controlled by a front panel on-off and gain control switch 25.

In the lower part of box 11 the sound detecting and indicating circuits are placed. A high frequency microphone is mounted inside the box and preferably has a directional reception characteristic pointed at the source of the sound energy produced by the sound generating part of the apparatus in order to achieve maximum sensitivity. Microphone 21 is connected to a preamplifier and gain controlled signal processing circuits as hereinafter described. The level of the output frequencies is measured by an output level member 23 or reproduced by a loudspeaker 24 or both.

The above-described elements constitute a sound level meter and may, if desired, be similar to units which are commercially available. Such signal circuits are readily designed to be battery operated and thus the softness tester of the present invention can be made completely portable.

Figure 3:
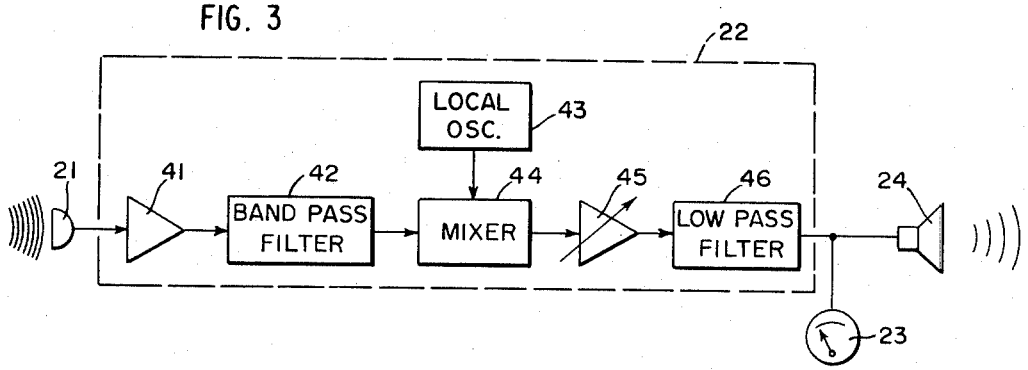
FIG. 3 is a block diagram of one form of signal detecting channel.

The simplified block diagram of one form of the signal detecting and evaluating apparatus of the invention is shown in FIG. 3.

The input signal is picked-up by microphone 21 and amplified by preamplifier 41. The preamplifier is connected to band pass filter 42 which eliminates frequencies below 15 kHz and above 44 kHz. The output of filter 42 is connected to mixer 44 to which the output of local oscillator 43 is also connected. Thus, the mixer mixes the filter signal with a 40 kHz signal from local oscillator 43. The mixed output of mixer 44 is led to amplifier 45 and then to low pass filter 46 with a frequency range 0–5 kHz. The output of filter 46 is connected to output signal level meter 23 and loudspeaker 24. Blocks 41 to 46 of block diagram of FIG. 3 are included in element 22 in FIG. 1.

Figure 4:
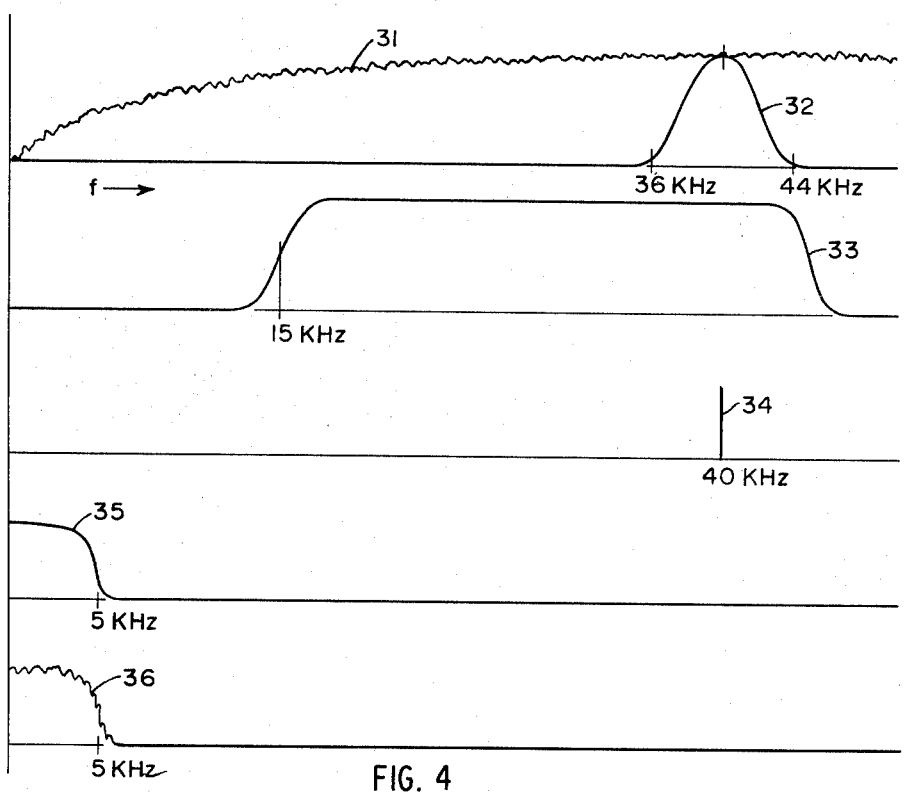
FIG. 4 is a frequency spectrum diagram showing the relation of various signals in the detector.

The operation of the signal translator can be understood by reference to FIG. 4 where the noise signal from all source is represented by curve 31 and the response of microphone 21 shown by curve 32. Frequencies below 15 kHz and above 44 kHz are eliminated by a filter response 33 in the signal channel prior to frequency conversion. By eliminating low frequency input signals the indication is insensitive to such things as motor and gear noise. The local oscillator frequency at 40 kHz is shown at 34 and the mixer output is amplified and passed through a 0–5 kHz filter 46 whose response is shown at 35. The translated noise output to the level meter 23 and loudspeaker 24 is indicated at 36.

The operation of the preferred embodiment of the invention will now be described. A strip of the fabric 15 to be tested is placed over roller 16 and rods 14 while the cover 12 of the box 11 is open. Then cover 12 is closed over the box 11, rods 13 pass between the spaces between rods 14 and idler roller 18 engages with driving roller 17. Cover 12 bears against box 11 tightly so as to constitute a sound-proof chamber, to eliminate external noise from the box. After switch 20 is turned on, the electrical circuits 21, 22 are excited by electrical power supply feed from power inlet 14 or by internal battery power if desired. As motor 19 is energized and begins to turn, roller 17 is driven by the motor. The paper strip is driven in the direction from entry roller 16, over rods 14 and under rods 13 and finally between rollers 17 and 18 out of the box 11. While passing the rods 13 and 14, the paper strip is being forced to bend around the small radius of these rods. This causes the fibers in the paper to rub against each other, thus producing an ultrasonic signal the level of which is proportional to the roughness and other factors relating to softness of the fibers. A fabric with lower compliance will produce a larger output signal level. A softer paper, having a higher compliance will produce a lower output signal level.

The ultrasonic signal is received by microphone 21, amplified and converted to an audible frequency signal in preamplifier and frequency converter 22. The level of the audible output signal is proportional to the softness of the paper strip tested and is measured is decibels by meter 23. At the same time the received acoustical signal is reproduced by loudspeaker 24. As previously stated the sound level meter may be of the types commercially available. One such equipment, for example, is Contact Probe Model 18020A and Ultrasonic Translator Detector Model 4905A, both manufactured by the Delcon Division of Hewlett Packard Company.

To ensure that the sample of fabric to be tested has constant tension during testing, a weight 10 is attached by a spring clip to the end of the strip 15 before the motor 19 is energized to start the test.

MODIFICATION AND ALTERNATIVE EMBODIMENT

Figure 5:
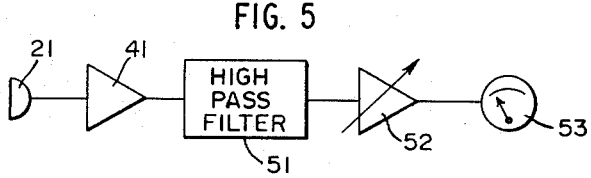
FIG. 5 is a block diagram of a simplified modification.

A simplified version of the method and apparatus is provided by this invention in which frequency conversion is not used. Thus FIG. 5 shows the microphone 21 coupled to preamplifier 41 which is followed by a high pass filter 51. The output of the filter 51 can be amplified in amplifier 52, if required, and then the output signal level is indicated on a meter 53. In this manner the high frequency sound components produced by flexing the fiber can be selected at any predetermined frequency range by means of the filter 51 and indicated without interference from low frequency extraneous noise. If the frequency range selected is ultrasonic, the indicator will obviously be by meter or other non-aural output.

Obviously many modifications can be made and alternate forms of apparatus can be used without departing from the scope of the invention as defined in the appended claims.

I claim:

1. The method of testing softness of paper fabric and other flexible materials comprising the steps of:

flexing a portion of the fabric to produce sound energy related to the softness characteristics of the fabric, sensing said sound energy to produce an electrical signal having a characteristic representative of the level of said sound energy, and evaluating said characteristic as a measure of the softness of said portion of said fabric.

2. The method according to claim 1 in which said steps of sensing and evaluating include the steps of selecting a predetermining ultrasonic frequency range of said sound energy, frequency converting said sound energy in said ultrasonic frequency range into an audio frequency range and indicating the level of energy converted to said audio frequency range.

3. The method according to claim 2 in which the step of indicating said level includes transducing said energy in said audio frequency range into an audible signal.

4. The method according to claim 1 in which said steps of sensing and evaluating include the steps of selecting a predetermined frequency range of said sound energy and producing said electrical signal with an amplitude representative of the level of said sound energy.

5. Apparatus for testing softness of paper fabrics and other flexible materials which comprises:

flexing means for flexing a portion of said fabric, means for advancing said portion of said fabric between said flexing means, so that sound energy is produced in accordance with relative softness of the fibers in the fabric, means for detecting said sound energy and producing an electrical signal having a characteristic representative of the level of said sound energy; and means for evaluating said characteristic.

6. Apparatus according to claim 5 in which said means for evaluating said characteristic includes means for selecting a predetermined frequency band of said sound energy and means for indicating the level of the selected frequency sound energy.

7. Apparatus according to claim 5 wherein said portion of said fabric is strip-formed, said means for flexing is mounted in a sound-proof chamber having an entrance and an exit portion, said advancing means comprises means for continuously driving said strip from said entrance to said exit portion at a constant rate.

8. Apparatus according to claim 5 wherein means for flexing comprises a plurality of small-radius rods of low friction material, rigidly mounted within the chamber.

9. Apparatus according to claim 5 wherein said means for continuously driving comprises a constant speed driving motor, a first friction drive roller connected to said motor, and a second friction drive roller engaging with said first roller, said drive rollers being adapted for feeding said strip of fabric through said means for flexing.

10. Apparatus according to claim 8 wherein said chamber comprises a box having a hinged-type cover, said rods comprise a first set of parallel rods rigidly mounted within the box and a second set of parallel rods rigidly mounted within the cover, each rod of the second set being designed to fit to a space between two adjacent rods of said first set of rods at the closed position of said cover.

11. Apparatus according to claim 5 wherein means for detecting said ultrasonic signal and generating a high frequency electrical signal comprises a high frequency microphone and preamplifier.

12. Apparatus according to claim 5 including means for converting said frequency electrical signal to an audible signal comprising a band pass filter, a local oscillator, a mixer connected to the output of said band pass filter and of said local oscillator and a low pass filter connected to the output of said mixer.

13. Apparatus according to claim 12 wherein an amplifier is connected between said mixer and said low pass filter.

14. Apparatus according to claim 5 wherein means for evaluating variations in a sound signal comprises a signal level measuring instrument and loudspeaker.

15. Apparatus for testing softness of paper fabrics and the like which comprises:

a housing having a cover movable to open and closed position;

a first set of parallel rods rigidly mounted within the housing;

a second set of rods parallel with those of the first set, rigidly mounted within said cover, the rods of said second set being designed to fit in the spaces between adjacent rods of said first set at said closed position of the cover, said rods being of low-friction material;

means for advancing a strip of the fabric to be tested between said first and second set of rods whereby the strip is forced to bend over one and under the other set of rods thus generating a sound signal;

means for detecting said sound signal and converting it to an electrical signal; and means for indicating the level of said electrical signal.

* * * * *